United States Patent
Davis

(10) Patent No.: US 7,182,379 B2
(45) Date of Patent: Feb. 27, 2007

(54) OBJECT LIFTING DEVICE THAT CONVERTS OPPOSING ANGLED LIFTING FORCES TO GIRTHING FORCES

(76) Inventor: Daniel M Davis, 4451 Ferncroft Rd., Mercer Island, WA (US) 98040

( * ) Notice: Subject to any disclaimer, the term of this patent is extended or adjusted under 35 U.S.C. 154(b) by 0 days.

(21) Appl. No.: 10/892,759

(22) Filed: Jul. 16, 2004

(65) Prior Publication Data
US 2005/0057056 A1    Mar. 17, 2005

Related U.S. Application Data

(60) Provisional application No. 60/555,932, filed on Mar. 24, 2004, provisional application No. 60/503,828, filed on Sep. 19, 2003.

(51) Int. Cl.
*A45F 5/00* (2006.01)
(52) U.S. Cl. ................................. 294/152
(58) Field of Classification Search ........... 294/152, 294/31.2, 150, 151, 157, 164, 165
See application file for complete search history.

(56) References Cited

U.S. PATENT DOCUMENTS

| 118,027 A | 8/1871 | Latham |
|---|---|---|
| 140,364 A | 7/1873 | Griffing |
| 215,344 A | 5/1879 | Flynn |
| 310,607 A * | 1/1885 | Old .......................... 294/153 |
| 413,981 A | 10/1889 | Taplin |
| 433,669 A | 8/1890 | Austin |
| 664,623 A | 12/1900 | Buckland |
| 701,146 A | 5/1902 | Cadwell et al. |
| 809,003 A | 1/1906 | Mitchell |
| 1,220,446 A | 3/1917 | O'Connor |
| 1,551,886 A | 9/1925 | Jensen |
| 1,600,931 A * | 9/1926 | Chatham .................... 248/318 |
| 1,839,636 A * | 1/1932 | Baker ........................ 294/27.1 |

(Continued)

FOREIGN PATENT DOCUMENTS

| DE | 8305 C | 6/1879 |

(Continued)

OTHER PUBLICATIONS

International Search Report for PCT/US04/29855, Jan. 3, 2005.

(Continued)

*Primary Examiner*—Eileen D. Lillis
*Assistant Examiner*—Esther Onyinyechi Okezie
(74) *Attorney, Agent, or Firm*—Christensen O'Connor Johnson Kindness PLLC

(57) ABSTRACT

An embodiment of an object lifting device includes compression straps to which gathering loops and handles are secured. In use, the straps and gathering loops encircle an object to be lifted. A pulling force applied to the handles causes the gathering loops to draw the ends of the straps toward each other, which results in the straps bearing upon the object to be lifted. While the object is held suspended, the weight of the object helps maintain the pulling pressure on the gathering loops and the consequent girthing action by the straps. The object is thus firmly secured by the device allowing it to be safely and easily lifted and transported.

31 Claims, 13 Drawing Sheets

U.S. PATENT DOCUMENTS

| | | |
|---|---|---|
| 2,080,148 A | 5/1937 | Naysmith |
| 2,856,069 A | 10/1958 | Felber |
| 3,507,533 A | 4/1970 | Beattie |
| 4,000,922 A | 1/1977 | Wade |
| 4,022,507 A | 5/1977 | Marino |
| 4,057,210 A * | 11/1977 | Wellman .................... 248/318 |
| 4,305,584 A * | 12/1981 | Leehan ....................... 473/127 |
| 4,492,399 A | 1/1985 | Randen et al. |
| 4,510,982 A * | 4/1985 | Sangroni .................... 224/657 |
| 4,756,567 A | 7/1988 | Nilson |
| 4,897,888 A | 2/1990 | Broersma et al. |
| 5,368,353 A | 11/1994 | Flanders et al. |
| 5,531,495 A | 7/1996 | Hohman |
| 6,062,520 A | 5/2000 | Ralston et al. |
| 6,412,740 B1 | 7/2002 | Rush et al. |

FOREIGN PATENT DOCUMENTS

| | | |
|---|---|---|
| DE | 299 18 728 U1 | 3/2000 |
| DE | 201 15 176 U1 | 2/2002 |
| DE | 202 00 573 U1 | 5/2002 |

OTHER PUBLICATIONS

Written Opinion of the International Searching Authority, for PCT/US04/29855, dated Jan. 3, 2005.

* cited by examiner

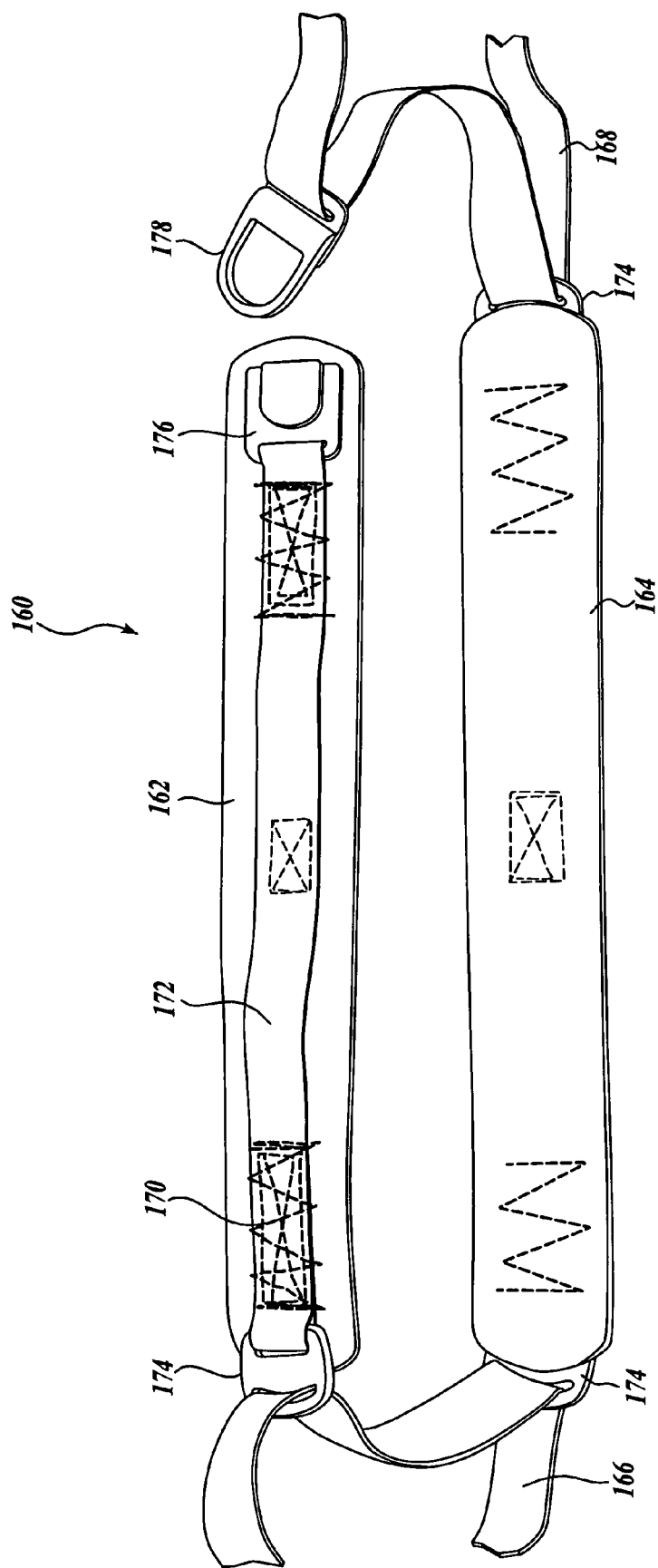

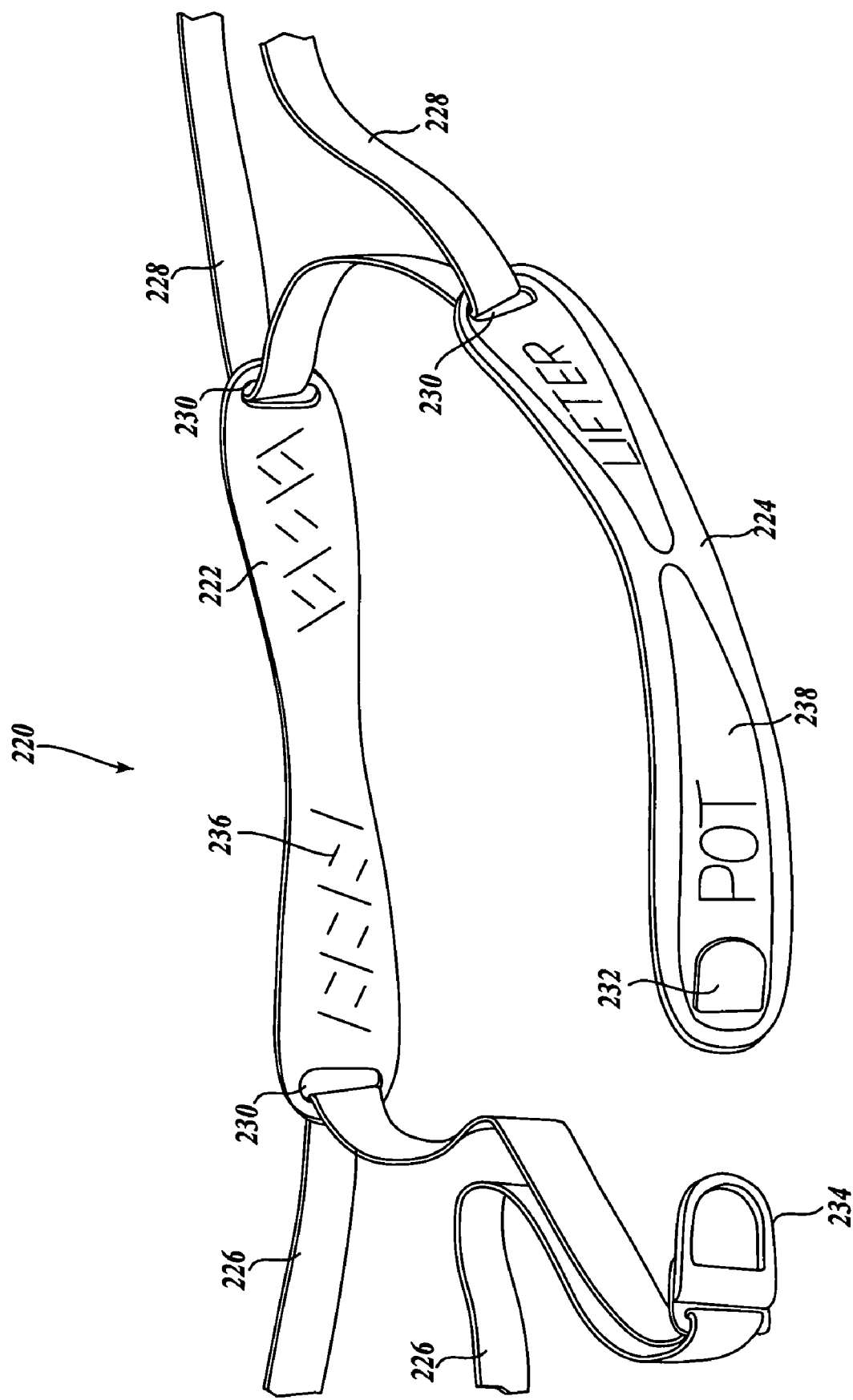

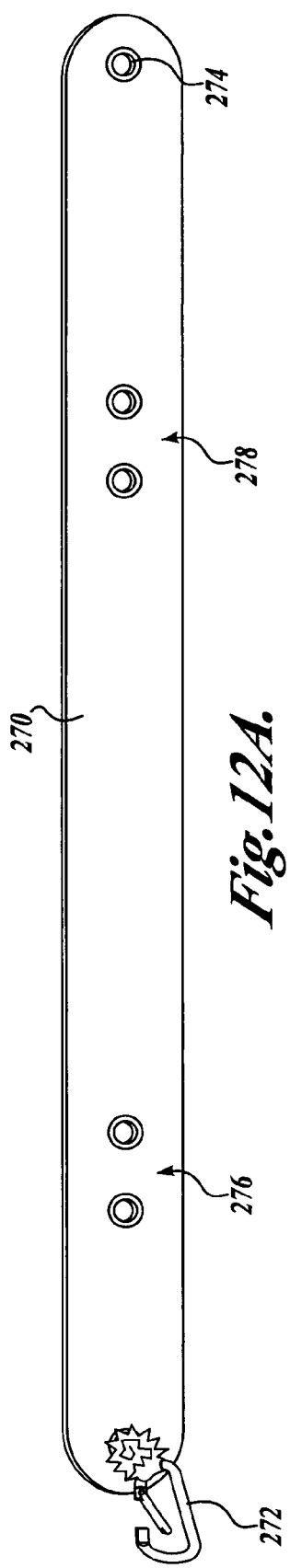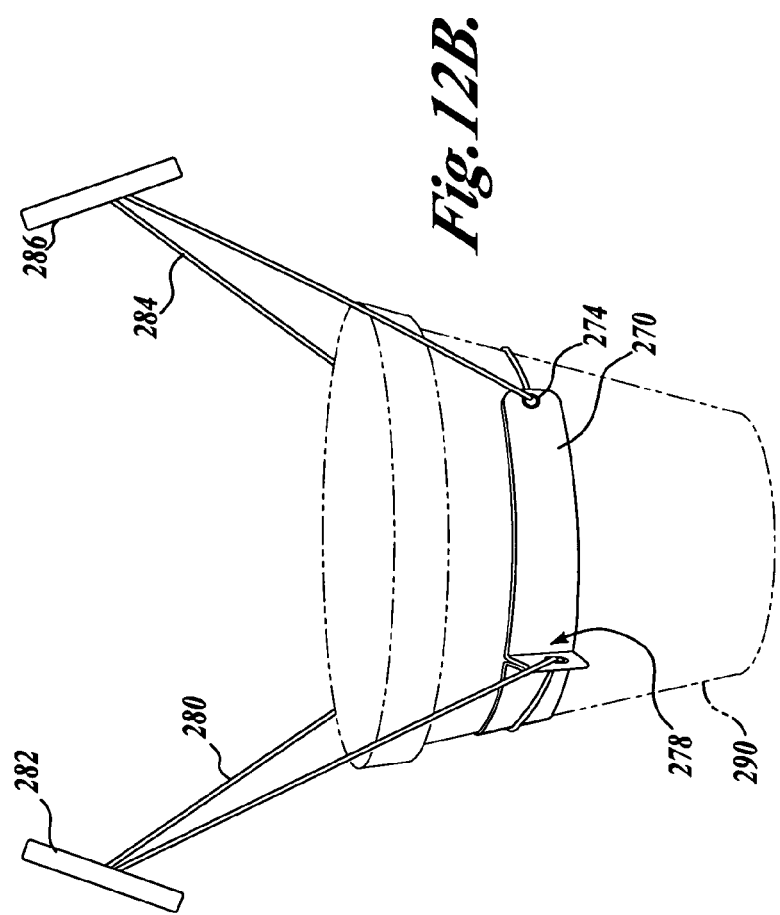

OBJECT LIFTING DEVICE THAT CONVERTS OPPOSING ANGLED LIFTING FORCES TO GIRTHING FORCES

CROSS-REFERENCES TO RELATED APPLICATIONS

This application claims the benefit of U.S. Provisional Application No. 60/503,828, filed Sep. 19, 2003, and U.S. Provisional Application No. 60/555,932, filed Mar. 24, 2004, the entire disclosures of which are incorporated herein by reference.

FIELD OF THE INVENTION

The present invention pertains to devices used for lifting and transporting objects.

BACKGROUND OF THE INVENTION

Heavy objects having rounded exteriors or asymmetrical edges, such as rocks, barrels, kegs, large flowerpots and other plant containers, etc., can be particularly unwieldy to pick up and move from place to place. The general shape of such objects, which typically lack adequate handholds, can make it awkward for even two or more persons to manually grasp, lift and carry them.

A number of devices have been contrived for moving such objects. Some of these devices consist of rigid members hinged in such a manner as to grip the sides of the object, such as a barrel or keg, when a lifting force is applied to the handles of the device by persons situated on either side of the object. Such devices are typified by those described in U.S. Pat. No. 118,027 (Oak, Barrel-Carriers); U.S. Pat. No. 664,623 (Buckland, Barrel Carrier); and U.S. Pat. No. 809,003 (Mitchell, Carrier for Barrels and the Like). These devices tend to be massive and bulky, and are mechanically complicated. Moreover, they are designed to handle barrels of a very limited size range.

U.S. Pat. No. 3,507,533 (Beattie, Lifting Handles For Use By Nurserymen) describes another rigid, hinged device specifically designed for lifting large plant containers by two persons. This device requires a horizontal flange mounted to the plant container to provide a bearing surface. A consistent inward, squeezing force on the handles, as well as a lifting force, must be manually applied by one of the persons carrying the container to ensure that the unsecured ends of the handles do not spread, thereby allowing the container to slip out of the device.

U.S. Pat. No. 4,000,922 (Wade, Collapsible Carrier for Kegs) describes yet another rigid, hinged device designed for two persons to lift and transport kegs. This device includes tooth-like pins that are directed upward and inward in a manner that causes them to dig into the sides of the lifted object, thus causing a gripping action when a lifting force is applied to the handles. These inwardly directed pins, however, deform the surface of the object.

U.S. Pat. No. 4,756,567 (Nilson, Self-Adjusting Barrel Harness) describes a choker-like device that lifts different size barrels by a single picking point (as by a crane). The device includes specialized brackets that grip the barrel sides and push up against a protruding lip around the barrel's edge.

U.S. Pat. No. 215,344 (Flynn, Barrel-Carrier) describes a two-handled barrel lifting device having an adjustable metal hoop that is tightened around the barrel's circumference by threaded nuts (in the fashion of turnbuckles). The barrel is lifted as sharpened corners of pivoting handles attached to the hoop bite into the sides of the barrel.

The device described in U.S. Pat. No. 1,839,636 (Baker, Milk Bottle Carrier) incorporates a pair of opposing jaw straps that are drawn tight against an upper lip of a bottle when a lifting force is applied to the attached cords (see FIGS. 1 and 2 of Baker). The arrangement of the cords through eyelets in a strap and their subsequent fixed attachment to eyelets in the opposite strap is not an arrangement that maximizes the gripping action of the straps against the sides of the bottle. This necessitates the presence of a bead or lip against which the jaw straps may press, as described in the patent. Also, the fixed attachment of the cords necessitates that the device be installed over the top (or from the bottom) of the bottle that is to be lifted. This design is impractical to use for objects that are of large height or girth, or for vessels that may contain shrubbery of sufficient height or width as to make such installation inconvenient. Baker does not address the use of materials that would be appropriate for lifting and transporting large and heavy vessels, nor does he incorporate the use of rigid lifting handles that would prove helpful in lifting heavy loads.

Embodiments of the present invention are directed to overcoming the foregoing problems and deficiencies that are present in the prior art.

SUMMARY OF THE INVENTION

An object lifting device according to one embodiment of the invention uses opposing straps and gathering loops to girdle and constrict an object, thereby allowing it to be lifted and transported. The device preferably enables persons to safely lift and convey objects that are ergonomically hazardous to grasp and move by hand. The device is flexible, collapsible, easy to store, simple to use, and readily adaptable to a variety of manual lifting and transporting applications on objects of various size and shape. The device is generally designed to not scrape, scratch or mar the surface of the lifted object. The device is constructed of components rugged enough to withstand repeated strenuous use, and is scalable in size and configuration to allow for the lifting of objects roughly manweight or less in size, up to objects weighing many tons.

An object lifting device according to one embodiment includes two flexible compression straps having holes near the ends thereof through which pass loops of cord, flexible cable, rope, flat fabric webbing, or the like, and to the ends of which are attached rigid handles. If desired, the holes near the ends of the straps may include grommets or eyelets in the strap material or eyes mounted on attachment bases attached to the straps. While rigid handles are often desired, they are not required.

In a second embodiment, a releasable securing mechanism, such as a hook, clasp, snap, spring-loaded link (such as a closable hook or carabiner), or a hook and loop (Velcro®) material, for example, is attached to one or both ends of a compression strap so that one or more of the gathering loops may be released, thus allowing the straps to be placed around the object to be lifted and then rehooked together with a gathering loop. This obviates the need to place the device over the top (or under the bottom) of the object. One or more shoulder straps may also be used with this or any of the other embodiments described herein.

In a third embodiment, the present invention incorporates the use of more than two straps, gathering loops and handles, thus allowing more than two persons to participate in lifting and transporting larger, heavier objects. For example, an embodiment for three or more persons may be provided using three or more strap-and-handle assemblies.

In a fourth embodiment, the ends of the compressing straps are fitted with attachment points for shackles. This configuration allows the device to be used for lifting very large and heavy objects. The shackles allow for convenient attachment of large cables or wire ropes to the straps. Loops in the ends of the cables or ropes may be connected to attachment points on a spreader bar, for example, which in turn can be hoisted by a crane.

In a fifth embodiment, a plurality of attachment loops are affixed along a length of the compression straps to allow for connection of cradling straps that pass from one compression strap under the object to be lifted to another compression strap on an opposite side. Such cradling straps may be adjustable in length to accommodate a broad range of objects of various size and shape. In this embodiment, the cradling straps are weight-bearing members and provide added security when lifting objects of irregular or upward tapering shapes that might not otherwise be securely gripped by the compression straps alone.

In a sixth embodiment, the gathering loops are formed using flat fabric webbing that passes through slotted, curvilinear shaped slots or holes in hardware elements attached at three of the four ends of the compression straps (in a two-strap embodiment). The curvilinear shaping of these slots optimizes the angular orientation of the gathering loop material when the object lifting device is applied either side up; that is, neither compression strap has a preferred upward or downward orientation when the device is applied to the lifted object. The remaining end of the compression straps (the one not fitted with a curvilinear slotted hardware piece) has attached to it the male half of a two-part buckle. The female half of this buckle is secured to one of the gathering loops. The compression straps form a girthing circle around an object when the female half of the buckle is connected to the male half of the buckle. The male half of the buckle is shaped such that the female half cannot easily become dislodged, especially while an object is being lifted.

In a seventh embodiment, length adjustment of the gathering loops is achieved by shortening or lengthening the amount of gathering loop material located between the rigid lifting handle and the ends of the compression straps. This shortening/lengthening capability is achieved in one embodiment by pulling the gathering loop material through diametrically opposed slots cut into the walls of the rigid handles. A particular length of a gathering loop may be maintained by pulling on either the proximal or distal portions of the gathering loop material in a manner which eliminates the slack in a loop of the material protruding through a third slot in the wall of the handle—this third slot being located approximately midway between the diametrically opposed slots. As slack is taken out of this loop, a D-ring, through which passes the gathering material, is pulled tightly against the side of the lifting handle, thus pinching the gathering loop material in a manner which disallows any additional material to be pulled either proximally or distally through the handle. This pinching action by the D-ring is eliminated when the D-ring is grasped and pulled away from the handle, thus allowing gathering loop material again to be pulled and lengthened either proximally or distally to the handle.

In an eighth embodiment, the compression straps and the slotted hardware elements (through which pass the gathering loops) are each fabricated as a single, monolithically injection molded element. The injection molded material may be a thermo-plastic-elastomer (TPE) that exhibits an optimal combination of mechanical strength and toughness, while remaining adequately flexible. In this embodiment, the first of a pair of compression straps has curvilinear-shaped slots or holes at both ends of the strap through which passes a gathering loop. The second of the pair of compression straps has a curvilinear slot or hole at one end, while the opposite end has an element shaped to form half of a two-part buckle. The second half of the buckle is a separate element secured to one of the gathering loops.

In yet further embodiments, a second TPE compositionally dissimilar to the primary TPE of the compression strap may be attached by insert injection molding to the previously molded compression strap. This second TPE may be a tough, resilient, high frictional coefficient material that penetrates the material of the compression strap to provide a contiguous element offering an enhanced gripping surface on the inner face of the strap. The second TPE may also be configured to form a logo or decorative feature on the outer surface of the strap. Embodiments may also include use of a single compression strap, use of multiple connectable articulating segments forming a compression strap, and/or use of a buckle in the middle of a compression strap, examples of which are described herein.

BRIEF DESCRIPTION OF THE DRAWINGS

The foregoing aspects and exemplary embodiments, and many of the attendant advantages of this invention, will become more readily appreciated as the same become better understood by reference to the following detailed description, when taken in conjunction with the accompanying drawings, wherein:

FIG. 8A is a pictorial view of another embodiment of an object lifting device in which flat webbing used for the gathering loops pass through slotted elements attached to the ends of the compression straps, with a two-part buckle that connects one end of a compression strap to a gathering loop;

FIG. 10 is a plan view of components of an embodiment in which the compression straps are monolithically injection molded;

FIGS. 12A and 12B provide a plan view and pictorial view of an embodiment that uses a single compression strap.

DETAILED DESCRIPTION OF PREFERRED EMBODIMENTS

Figure 1:
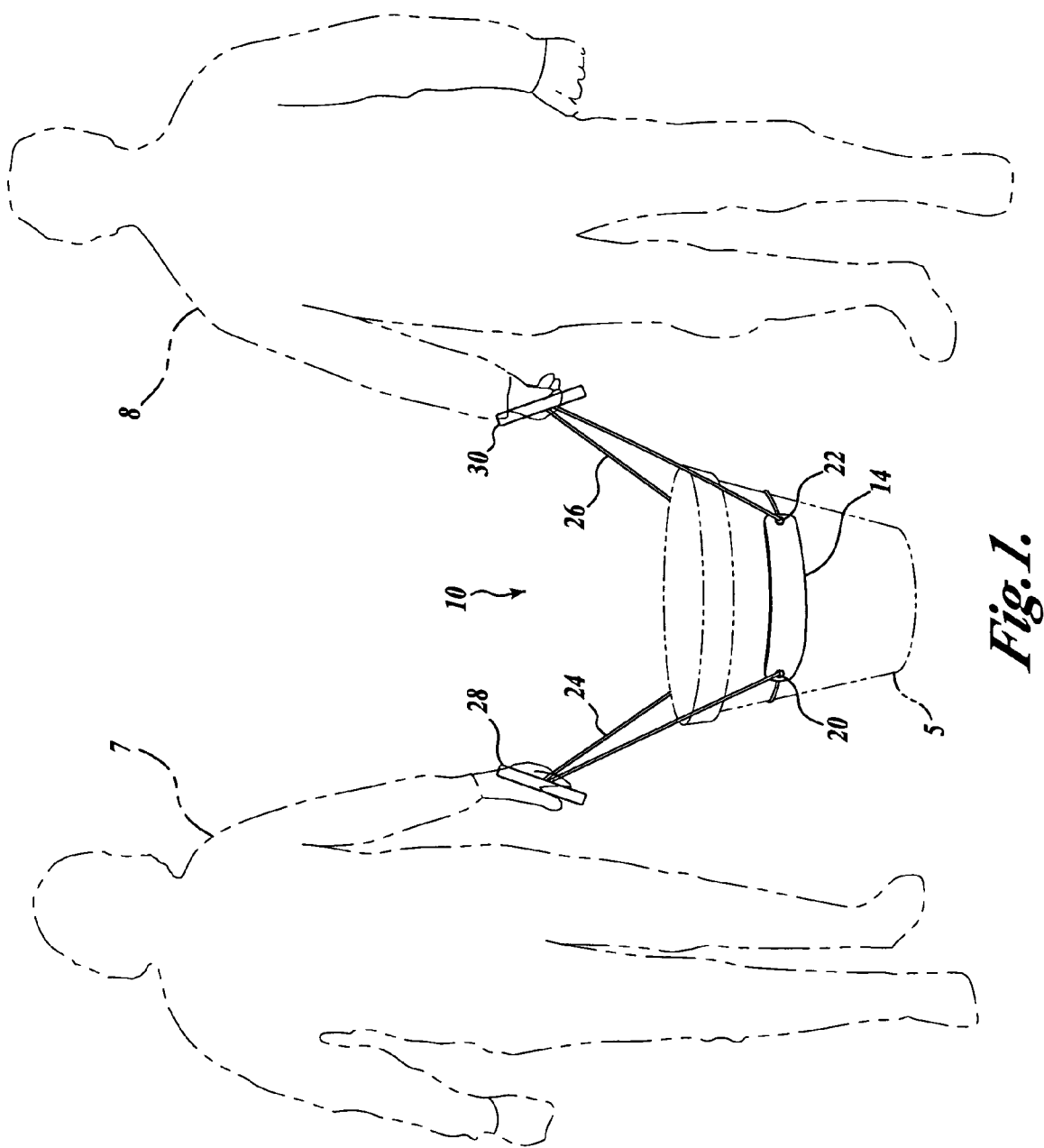
FIG. 1 is a pictorial view of an object lifting device according to one embodiment of the invention shown in an environment in which the device is being used to lift an object.

FIG. 1 provides a perspective view of an object lifting device 10 constructed according to one embodiment of the invention in an environment in which it may be used. The object lifting device 10 is shown installed around a typical object (in this case, a plant pot 5). For illustrative purposes, persons 7 and 8 are shown using the device 10 to lift the plant pot 5.

As will be described in greater detail below in regard to FIG. 2, the object lifting device 10 shown in FIG. 1 includes compression straps 12 and 14 that are used to grasp the plant pot 5. While the compression strap 12 is positioned behind the pot 5, and thus is hidden from view in this drawing, the strap 12 functions similar to the strap 14 shown in this view. Connected to the compression straps 12, 14 are gathering loops 24 and 26 which are respectively connected to handles 28 and 30. FIG. 1 generally depicts the manner in which a pulling or lifting force applied by the persons 7 and 8 to the handles 28 and 30 cause a leveraged gathering of the ends of the compression straps 12, 14, thus pulling the straps 12, 14 tight against the sides of the pot 5.

Figure 2:
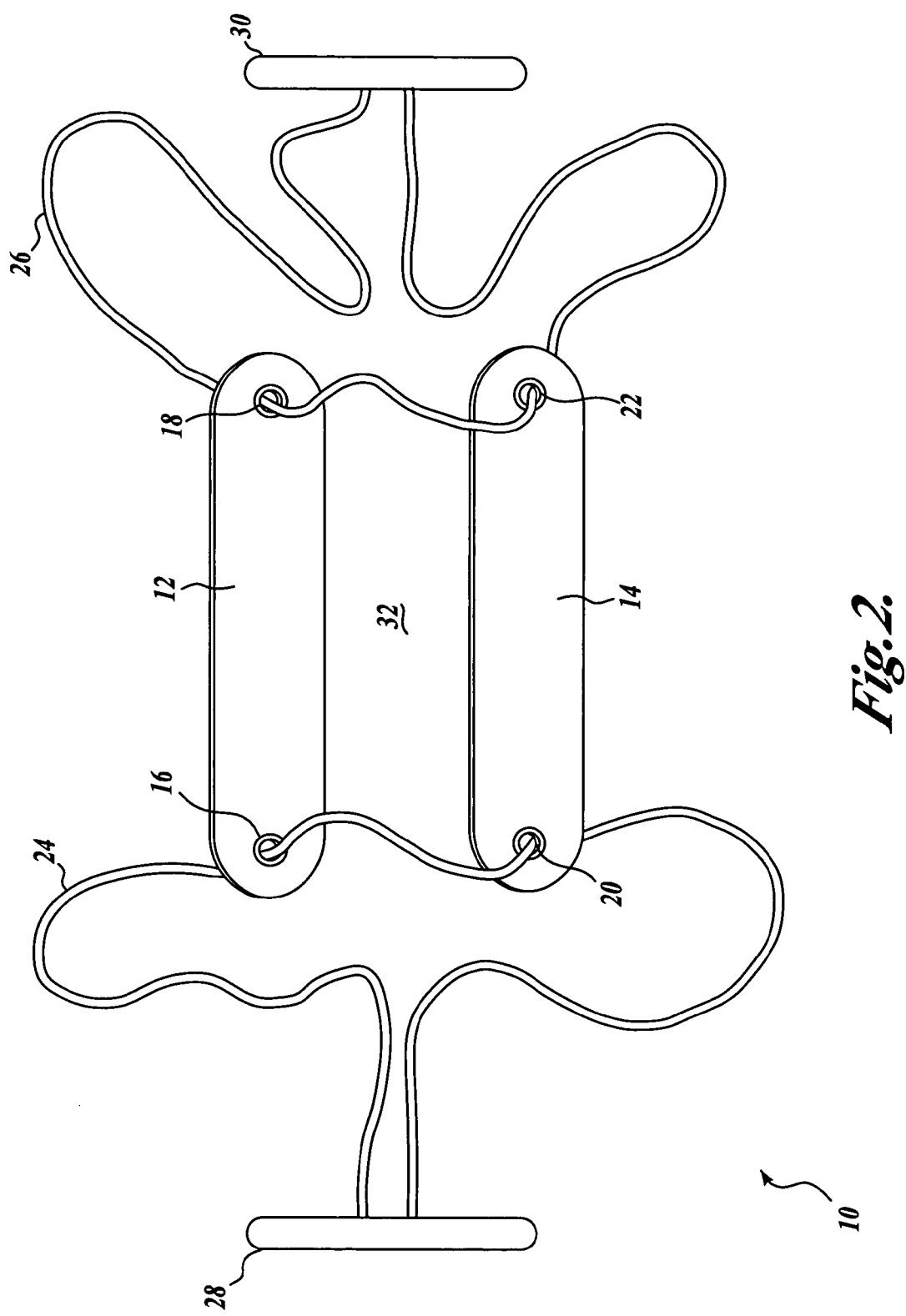
FIG. 2 is a plan view of components of the object lifting device shown in FIG. 1, including compression straps, gathering loops, and handles.

Turning now to FIG. 2, the object lifting device 10 is shown including two compression straps 12 and 14 that are approximately equal in length, though in other embodiments, the lengths of the straps 12, 14 may differ. In this particular embodiment, the compression strap 12 is penetrated by holes 16 and 18 near opposing ends of the strap 12. Each of the holes 16 and 18 are shown fitted with grommets for added strength. Similarly, the compression strap 14 is shown penetrated by holes 20 and 22 near the opposing ends of the strap 14. The holes 20 and 22 are also shown fitted with grommets.

As the straps 12 and 14 are positioned in FIG. 2 lying parallel to one another, a gathering loop 24, comprised of a cord in this example, passes through the adjacent pair of holes 16 and 20 of the straps 12 and 14. The ends of the gathering loop 24 are affixed to a rigid handle 28. Similarly, a gathering loop 26, comprised of a cord in this example, is shown passing through the adjacent pair of holes 18 and 22 of the straps 12 and 14. The ends of the gathering loop 26 are affixed to a rigid handle 30.

An object to be lifted by the device 10 is generally positioned in the area 32 encircled by the connected compression straps 12, 14 and gathering loops 24, 26. Tension applied to the handles 28, 30 and the gathering loops 24, 26 pulls the ends of the compression straps 12, 14 toward each other, thus tightening the straps 12, 14 against the sides of the object to be lifted, e.g., as shown in FIG. 1.

The compression straps 12, 14 may be made of any material. Typically, the material is sufficiently strong and tough to survive the stresses applied to it by the weight of the object being lifted, yet sufficiently flexible to conform to some degree to the sides of the object being lifted. To enhance friction between the compression straps 12, 14 and the lifted object, the strap surface facing the object may be rubberized or otherwise coated or injected with a pliable, compressible substance that provides a good adhering surface.

The holes 16, 18, 20, 22 through which pass the gathering loops 24, 26 are preferably fitted with grommets of a size that allows the gathering loops to slide freely. The length and width dimensions of the compression straps 12, 14 can vary and to a certain degree be dependent upon the size and weight range of the objects to be lifted. In a currently preferred embodiment, the length of the straps 12, 14 equals approximately 20–45% of the circumference of the objects to be lifted, and the strap width is approximately 15–20% of the strap length. Other applications of the device 10 may call for straps 12, 14 of a greater or lesser width and length.

The gathering loops 24, 26 may be made of any cord-, rope-, cable- or strap-like material. Typically, the material forming the gathering loops is sufficiently strong and tough to survive the stresses applied to it by the weight of the object being lifted. The material also is preferably not stretchable, but pliant enough to form acute angles without compromising the integrity or strength of the gathering loops.

Figures 8B, 9:
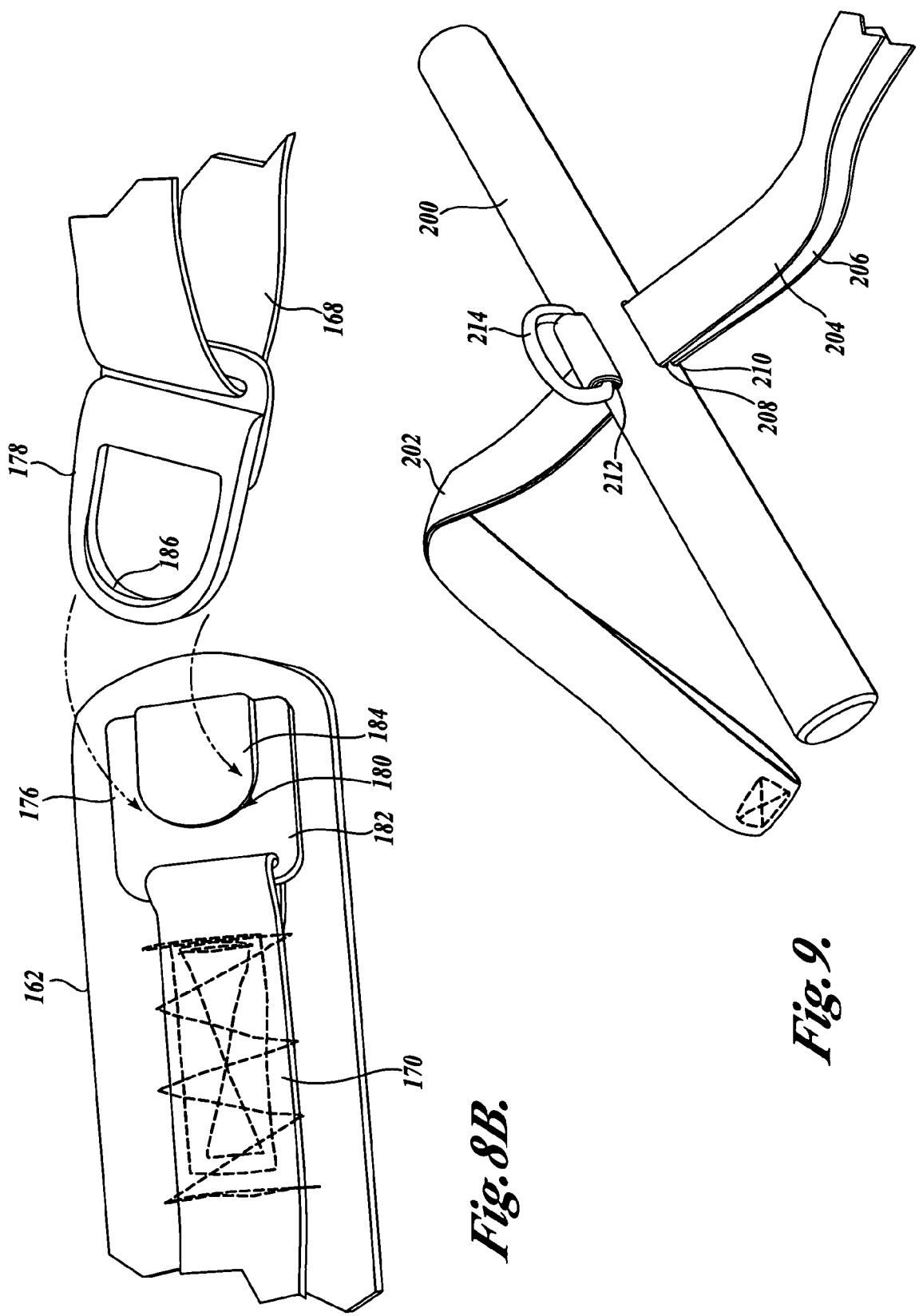
FIG. 8B is a closer pictorial view of the two-part buckle shown in FIG. 8A.
FIG. 9 is a pictorial view of an embodiment that includes a gathering loop formed of flat webbing passing through slots defined in a handle, with a mechanism by which the length of the gathering loop may be adjusted.

The handles 28, 30 to which the gathering loops 24, 26 are affixed may be made of wood, metal, plastic, or any material, preferably rigid and rod-shaped, that is easily gripped by one or two hands, and is strong enough to survive the stresses applied to it by the weight of the object being lifted. In one embodiment, the gathering loops 24, 26 are affixed to the handles 28, 30 by passing the ends of the gathering loops through holes defined in the handles, and then simply tying or swaging the ends together. This would allow the gathering loops 24, 26 to be readily drawn through the holes in the handles 28, 30 in order to inspect for chafing and wear. In other embodiments, the handles 28, 30 are equipped with a mechanism (e.g., as shown in FIG. 9) that enables the length of the gathering loops 24, 26 to be adjusted and fixed, particularly to shorten the gathering loops when the object needs to be lifted high, as onto the back of a truck, for example.

Figure 3:
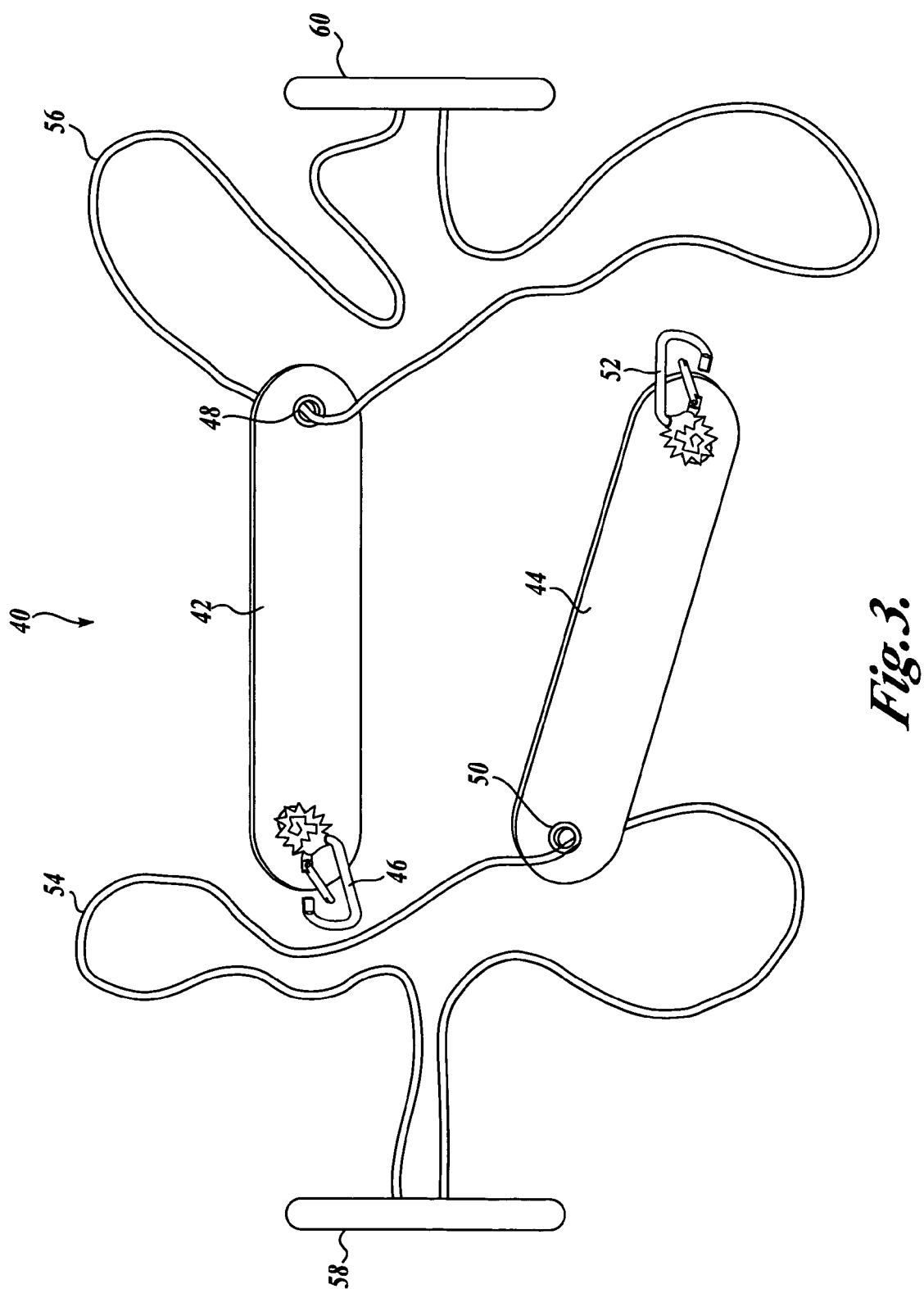
FIG. 3 is a plan view of another embodiment of an object lifting device that includes spring-loaded clips in place of holes at opposing ends of the compression straps.

FIG. 3 is a plan view of another embodiment of an object lifting device 40 that includes compression straps 42 and 44. Similar to the object lifting device 10 shown in FIGS. 1 and 2, the device 40 shown in FIG. 3 includes a gathering loop 54 affixed to a handle 58, and a gathering loop 56 affixed to a handle 60. The gathering loop 56 passes through a grommeted hole 48 at one end of the compression strap 42, while the gathering loop 54 passes through a grommeted hole 50 at an end of the compression strap 44.

In contrast to FIG. 1, the ends of the compression straps 42, 44 opposite of the grommeted holes 48, 50 have detachable securing mechanisms in the form of clips 46 and 52 affixed thereto. In this particular embodiment, the clips 46 and 52 include a spring-loaded element that is operable between an open and closed position. In the open position, the clip 46 may be detached from the gathering loop 54. Similarly, when in the open position, the clip 52 may be detached from the gathering loop 56. Using one or both of the clips 46, 52 to detach the compression straps 42, 44 from the gathering loops 54, 56 enables the straps 42, 44 to be passed around the sides of the object to be lifted without having to place the device 40 over the top (or under the bottom) of the object being lifted. The lifting capability of the device 40 is restored when the gathering loops 54 and/or 56 are reattached to the compression straps 42, 44 by the clips 46, 52.

The securing mechanisms, here spring-loaded clips 46, 52, are preferably of such size and load-bearing capacity as to readily tolerate any stresses applied to them by the weight of the object being lifted. In this particular embodiment, the clips 46, 52 are shown attached to the compression straps 42, 44 by a sewn and reinforced fabric gusset. Other embodiments of the device 40 may use other methods to attach the clips 46, 52 to the compression straps 42, 44.

Figure 4:
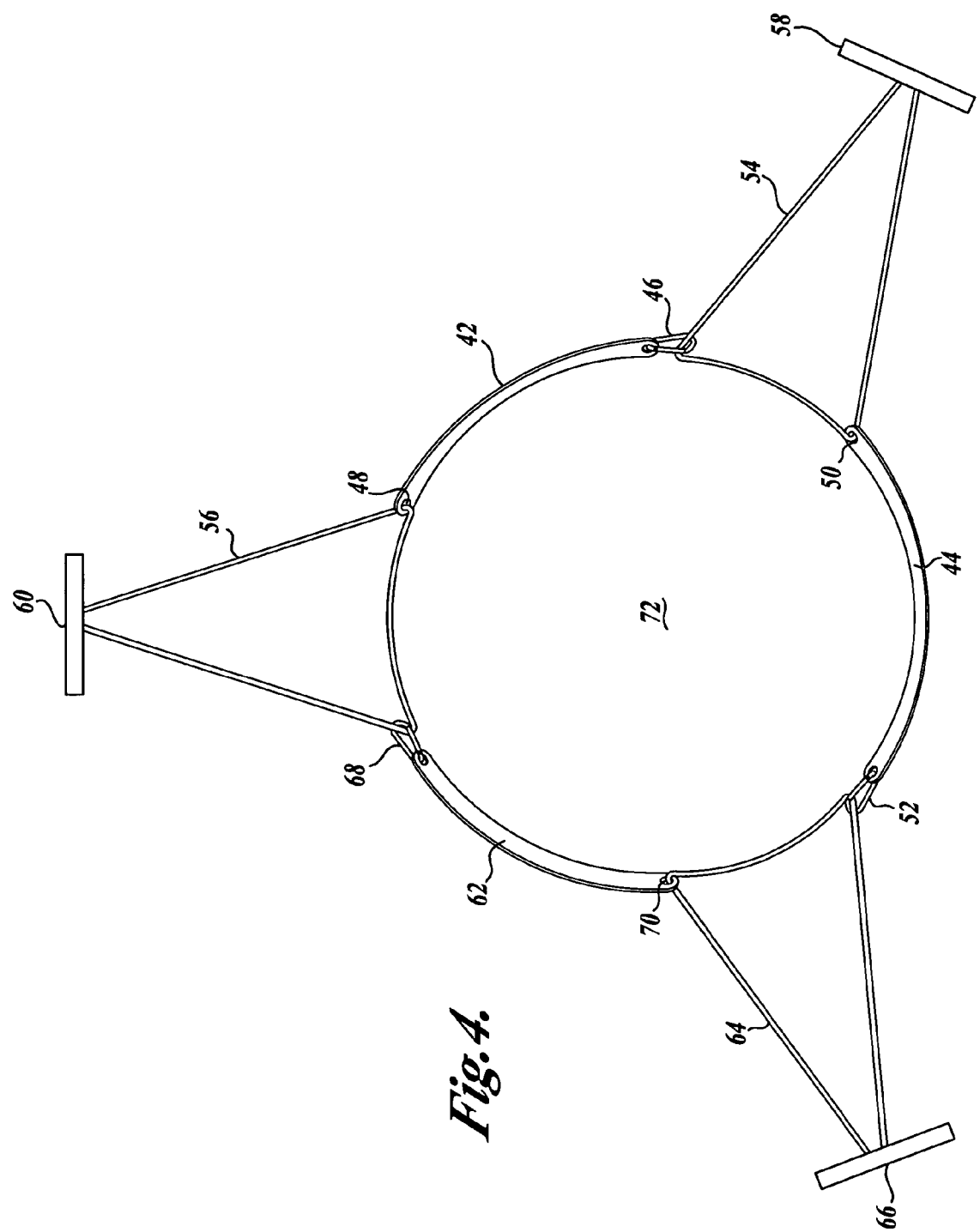
FIG. 4 is a plan view of another embodiment of an object lifting device in which more than two compression straps, gathering loops and handles as shown in FIG. 3 are utilized for lifting an object.

FIG. 4 is a plan view of an embodiment of the invention that includes more than two compression straps, gathering loops, and lifting handles. This arrangement, or any variation thereof using additional straps, loops, and handles, allows for lifting and transporting an object that is larger and heavier than can be readily carried by two persons. The compression straps 42, 44 and 62, gathering loops 54, 56 and 66, and handles 58, 60, and 64, are shown having like dimensions to promote an equal distribution of the load around the circumference of an object 72 being lifted.

The embodiment shown in FIG. 4 includes the strap, loop, and handle portions of the object lifting device 40 shown in FIG. 3, along with an additional, similarly-configured strap 62, loop 64, and handle 66. The additional gathering loop 64 passes through a grommeted hole 70 in the strap 62. A clip 68 is shown attaching the strap 62 to the gathering loop 56, while the clip 46 attaches the strap 42 to the gathering loop 54, and the clip 52 attaches the strap 44 to the gathering loop 64, thus forming an alternating series of gathering loops and straps that encircles the object 72 to be lifted. To facilitate encircling the object 72, any one of the clips 46, 52, and 68 may be detached from the respective gathering loops 54, 64, and 56, which enables the separated components to be passed around the object 72, and then reattached as shown in FIG. 4.

Figure 5:
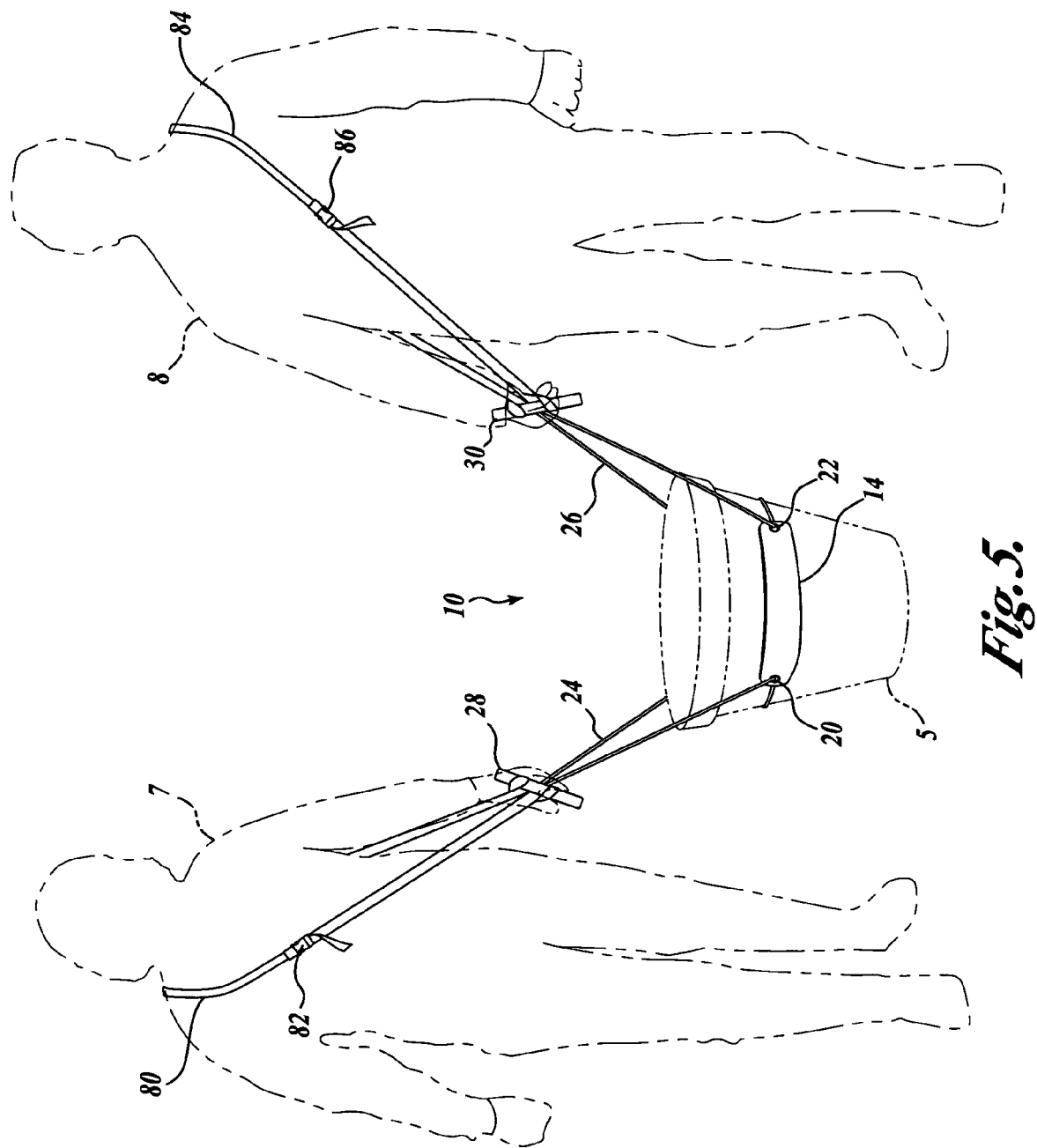
FIG. 5 is a pictorial view of an object lifting device as shown in FIG. 1, further equipped with shoulder straps connected to each of the handles of the device.

FIG. 5 is a pictorial view of an object lifting device 10 as shown in FIG. 1. The object lifting device 10 is further equipped with shoulder straps 80 and 84 that have been attached to the handles 28 and 30. The shoulder straps 80, 84 are draped over the head and across a shoulder of each of the persons 7, 8 that are using the device 10 to lift the object 5. While the device 10 is used in a fashion similar to that described with respect to FIGS. 1 and 2, the shoulder straps 80, 84 distribute much of the load weight from the gripping hand and arm of the persons 7 and 8 to the upper torso of the persons 7, 8. This arrangement may help alleviate fatigue in situations where the lifted object must be transported a significant distance, or in situations of repeated lifting and carrying as might occur in commercial nursery or landscaping operations.

The shoulder straps 80 and 84 may be formed of a single, endless loop of nylon webbing. The shoulder straps may also include an arrangement of buckles 82 and 86, respectively, that allow the persons 7 and 8 to adjust the length of the shoulder straps 80, 84. Furthermore, the straps 80, 84 may be fixedly attached to the handles 28, 30, or may be temporarily attached as shown in FIG. 5. In FIG. 5, the shoulder straps 80, 84 are attached to the handles 28, 30 by looping each shoulder strap around itself and the handles 28 and 30, respectively.

Figure 6:
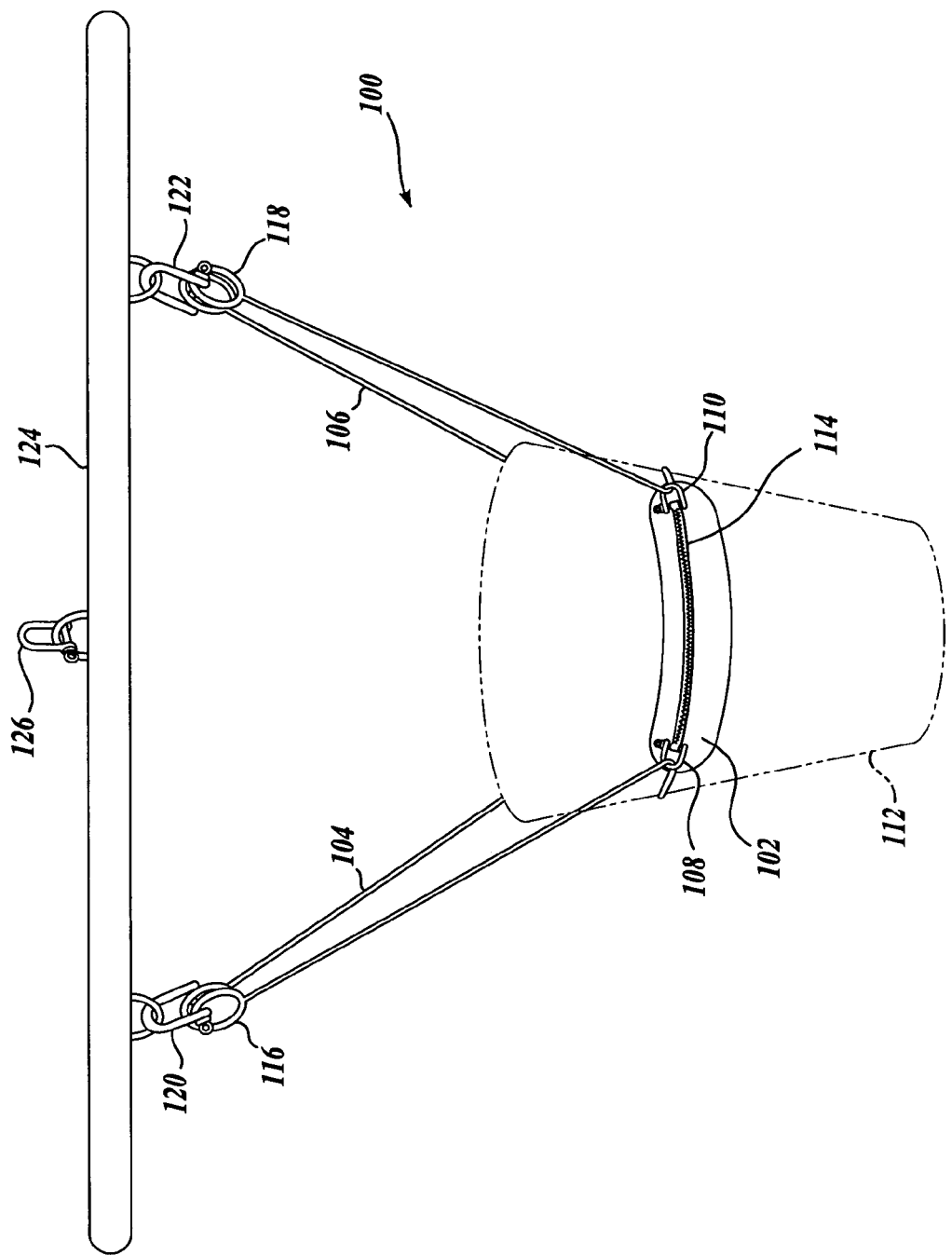
FIG. 6 is a pictorial view of another embodiment of an object lifting device constructed according to the invention having shackles and rings providing points of attachment for lifting an object.

FIG. 6 provides a pictorial view of an object lifting device 100 constructed according to an embodiment of the invention especially adapted for using a crane or other hoisting machinery to provide power to lift and transport objects that are large and/or heavy. As will be described below, the object lifting device 100 includes shackles and rings that provide points for attachment in the object lifting device 100.

The object lifting device 100 includes a compression strap 102 connected to gathering loops 104 and 106 to function in a manner similar to straps 14 and 44 that previously described. In place of holes or clips at the ends of the compression strap 102, shackles 108 and 110 are provided at the opposing ends of the compression strap 102. The gathering loops 104, 106 pass freely through the shackles 108, 110. A similarly-configured compression strap (not shown) is provided and positioned on the opposite side of the object 112 being lifted, much like straps 12 and 42 previously described.

In place of handles, as previously described, the gathering loops 104, 106 are shown attached to rings 116 and 118, respectively. The rings 116, 118 are preferably adapted in shape and construction to connect to shackles 120 and 122, respectively, that secure the object lifting device 100 to a hoisting element, such as a spreader bar 124. In this embodiment, the spreader bar 124 provides a single point of attachment 126 that allows the entire assembly to be hoisted by a crane or other machinery.

In this embodiment, the compression strap 102 includes a reinforcing band 114 attached along the length of the compression strap, though in other embodiments the reinforcing band 114 may be attached along only a portion of the compression strap. The reinforcing band is made of a strong, tough, typically non-stretchable synthetic fabric or metal and is affixed to the compression strap 102 by means such as riveting, heavy stitching, or the like. The ends of the reinforcing band 114 is shown configured into loops to which the shackles 108, 110 are attached.

Figure 7A:
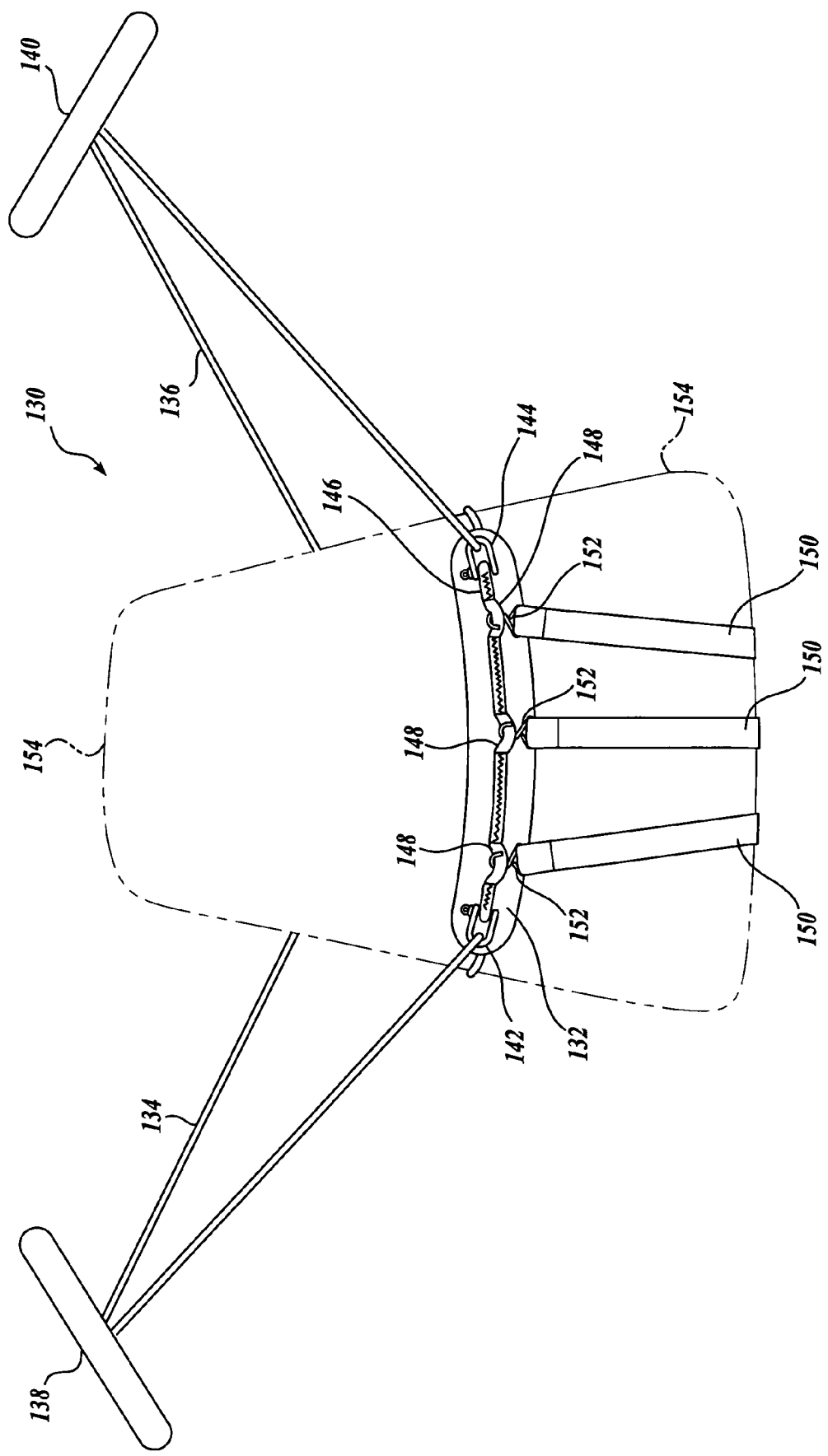
FIG. 7A is a pictorial view of another embodiment of an object lifting device in which cradling straps are shown connected to attachment loops that are affixed to the sides of the compression straps.
Figure 7B:
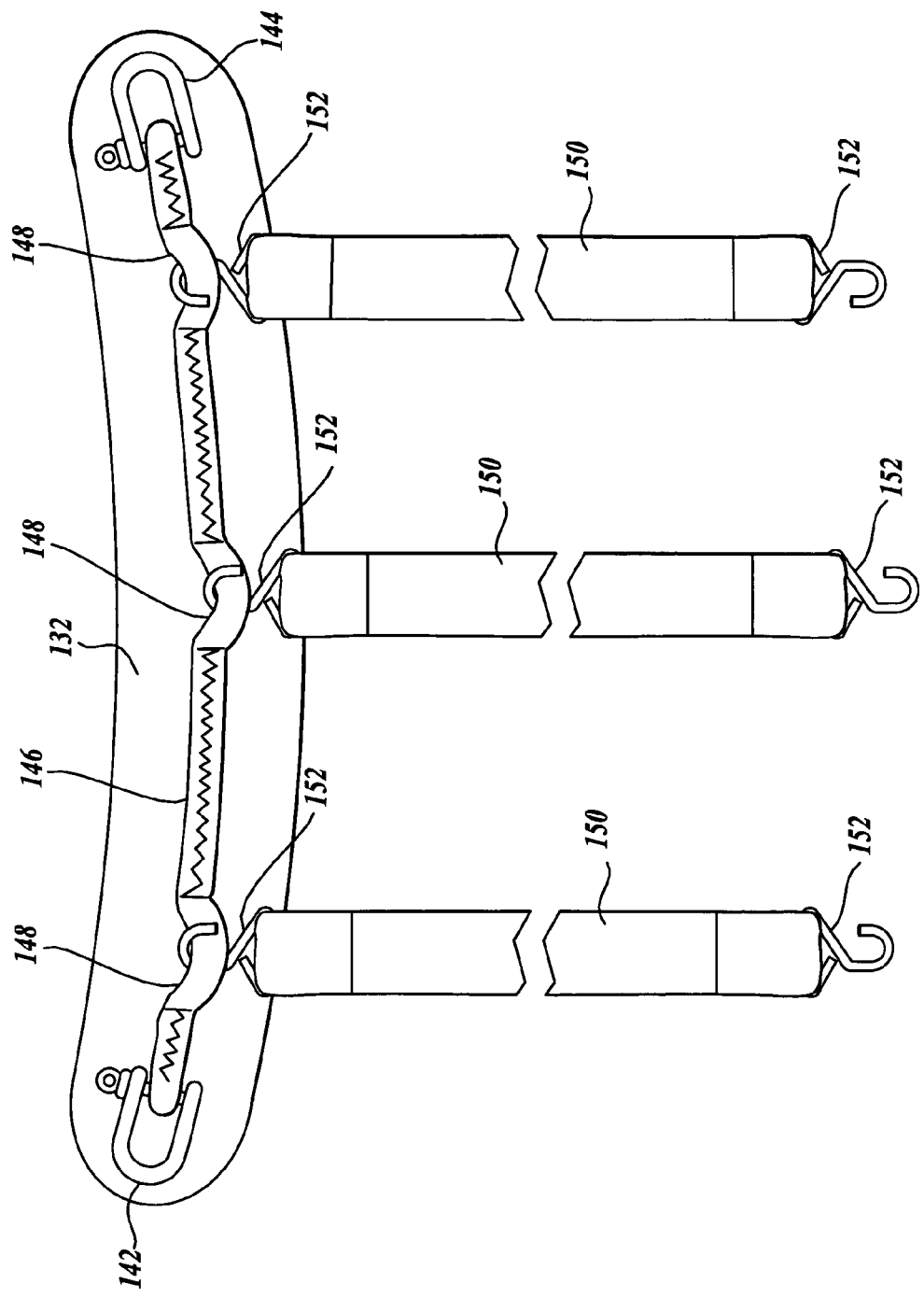
FIG. 7B is a closer pictorial view of a compression strap and cradling straps as shown in FIG. 7A.

FIGS. 7A–7B are views of an embodiment of an object lifting device 130 that may be used to lift and transport objects that are large and heavy, irregular in shape, or possess an upward taper that makes it difficult for the compression straps to securely grip the object. As will be better understood from the description below, the object lifting device 130 is further equipped with cradling straps that help secure the device 130 to the object being lifted.

As with embodiments previously described, the object lifting device 130 includes a compression strap 132 attached to gathering loops 134 and 136. A similarly-configured compression strap (not shown) is provided positioned on the opposite side of the object 154 being lifted. The gathering loops 134, 136 are attached to handles 138 and 140, respectively. As with the object lifting device 100 shown in FIG. 6, the compression strap 132 shown in FIGS. 7A and 7B uses shackles 142 and 144 at the respective ends of the strap 132 to attach the strap to the gathering loops 134 and 136.

A reinforcing strap 146 made of strong, tough, typically non-stretchable synthetic fabric or metal is connected to the compression strap 132 by riveting, heavy stitching, or the like. In this embodiment, the reinforcing strap 146 is not contiguously affixed to the compression strap 132 along its entirety, but remains loosely disconnected in one or more sections to provide convenient hooking loops 148 for connecting cradling straps 150 thereto. The cradling straps 150 are fitted with hooks 152 or other securing mechanisms, such as clips or buckles, at either end for attachment to the hooking loops 148. The cradling straps 150 pass under the object 154 from one compression strap to another compression strap to help secure the object 154 to the compression straps. The cradling straps 150 are preferably adjustable in length to accommodate a wide size range of objects to be lifted, and are constructed of materials that accommodate stresses applied to them by the weight of the objects being lifted. The cradling straps 150 may also be weight-bearing members that provide added security when lifting objects of irregular or upward tapering shapes that the compression straps alone might not otherwise securely grip.

FIGS. 8A and 8B depict components of another embodiment of an object lifting device 160 constructed in accordance with the present invention. As with other embodiments described herein, the object lifting device 160 includes compression straps 162 and 164 that are attached to gathering loops 166 and 168. Similar to the compression strap 132 of the device 130 shown in FIGS. 7A and 7B, the compression strap 162 has a reinforcing strap 170 affixed thereto. A similar reinforcing strap is affixed to the other side of the compression strap 164. As shown in FIG. 8A, the reinforcing strap 170 is not affixed to the compression strap 162 contiguously along its entirety, but remains disconnected in a plurality of sections so as to provide convenient hooking loops 172 for optionally connecting cradling straps (not shown).

In this particular embodiment, the gathering loops 166 and 168 are comprised of a flat, woven fabric, typically a synthetic material such as nylon, that passes through curvilinear slots defined in slotted elements 174 that are secured to three of the four ends of the compression straps 162, 164. The shape of the slots in the elements 174 is such that a proper configuration and orientation of the gathering loops 166, 168 is achieved regardless of the orientation of the compression straps 162, 164 on the object being lifted. In other words, the shape of the slots in the slotted elements 174 allows complete invertability of the device 160 upon the object to be lifted. It does not matter which edge of the straps 162, 164 is oriented in an up or down direction relative to the object being lifted. The slots in the slotted elements 174 are preferably defined wide enough to allow the gathering loops 166, 168 to easily slip through, yet remain sufficiently narrow to inhibit twisting of the gathering loops 166, 168 in the slots.

At the end of the compression strap 162 that does not have a slotted element 174 is the first half 176 of a two-part securing mechanism, here a male half of a two-part buckle. The female half 178 of the buckle is defined with a slot through which the gathering loop 168 has been passed. A girthing circle of the straps 162, 164 and the gathering loops 166, 168 may be formed around an object to be lifted when the female half 178 of the buckle is passed around the object to be lifted and attached to the male half 176.

The male half 176 of the buckle is preferably shaped such that the female half 178 cannot easily become dislodged, particularly while tension is maintained on the gathering loop 168. FIG. 8B provides a closer pictorial view of the two-part buckle used in this embodiment. In FIG. 8B, the male half 176 is comprised of a lower surface 182 connected to an upper surface 184. A groove 180 is defined around or along the junction of the upper surface 184 and lower surface 182.

The female half 178 of the buckle is configured with an opening sized to receive the upper surface 184 of the male half 176. In particular, an inwardly-directed flange 186 on the female half 178 is sized and shaped to engage the groove 180 in the male half 176. When the female half 178 and male half 176 are thus attached, the flange 186 sits within the groove 180 and provides a positive connection between the two halves of the two-part buckle, particularly while tension is maintained on the gathering loop 168.

While rigid handles are not required in any of the foregoing embodiments, when handles are used the gathering loops may be connected to the handles in a variety of ways. FIG. 9 illustrates one embodiment of a handle 200 through which a gathering loop 202 comprised of flat, woven synthetic material is attached. As will be seen below, an advantage of the embodiment shown in FIG. 9 is that the length of the gathering loop 202 between the handle 200 and the compression straps to which it is connected may be adjusted as needed.

As shown in FIG. 9, a first strand 204 of the gathering loop 202 enters into the handle 200 through a slot 208 defined in the handle. A second strand 206 of the gathering loop 202 enters into the handle 200 through a slot 210 that is adjacent and generally parallel to the slot 208. At a mid-portion of the interior of the handle 200, the slots 208 and 210 join to form a single slot 212 through which the strands 204, 206 pass out of the handle 200. In the embodiment shown, the slot 212 is oriented approximately 90° from the direction of original entrance slots 208, 210. The strands 204, 206 pass through a length adjusting mechanism, here a rigid D-ring 214, and back into the handle 200 through the same slot 212 that they exited. The strands 204, 206 then continue through the interior of the handle 200 and exit out of the handle through another slot (not shown) located opposite of the side through which the strands 204, 206 originally entered.

The length of the gathering loop 202 between the handle 200 and the rest of the object lifting device is shortened or lengthened by pulling the gathering loop 202 through the slots in the handle 200. In this particular embodiment, pulling the D-ring 214 creates slack in the gathering loop 202 that allows the gathering loop 202 to be pulled through the handle 200 in a desired direction away from or toward the compression straps to which the gathering loop is connected. As the strands 204, 206 of the gathering loop 202 are pulled away from the handle 200, the slack is taken out of the gathering loop 202, thus pulling the D-ring tightly against the side of the handle 200 and pinching the material of the gathering loop in the slot 212. The pinching of the gathering loop 202 acts to prevent the gathering loop 202 from being pulled either proximally or distally through the handle 200. When the length of the gathering loop 202 needs to be adjusted, the D-ring 214 may be pulled away from the handle 200 and the gathering loop 202 may be pulled proximally or distally, as described above.

FIG. 10 illustrates yet another embodiment of an object lifting device 220, constructed in accordance with the present invention. As with other embodiments previously described, the object lifting device 220 includes compression straps 222, 224 to which gathering loops 226, 228 are attached. In this embodiment, the compression straps 222, 224 are monolithically injection molded using a tough, semi-rigid thermoplastic elastomer (TPE). The compression strap 222 includes curvilinear-shaped holes or slots 230 located at both ends of the strap 222 through which pass the gathering loops 226, 228. The compression strap 224 includes a curvilinear hole or slot 230 at one end through which passes the gathering loop 228, while the opposite end of the strap 224 includes an integrally-formed element 232, in this case shaped to form the male portion of a two-part buckle. The female portion 234 of the buckle has been threaded onto and is carried by the gathering loop 226. When the female portion 234 of the buckle is passed around an object to be lifted and attached to the male portion 232, the compression straps 222, 224 and gathering loops 226, 228 can be used to grasp and lift the object, as previously described.

The inner face of the compression straps 222, 224 may include raised bumps or ridges 236 comprised of a material, such as a secondary TPE that may be materially dissimilar to the TPE comprising the compression straps 222, 224. The secondary TPE may be injection molded such that it penetrates the primary TPE material of the compression straps 222, 224 and provides an enhanced contiguous gripping surface on the inner side of each strap. The secondary TPE may also provide a decorative feature in the form of a logo 238 or other design element on the outer surface of the straps 222, 224.

Figure 11A:
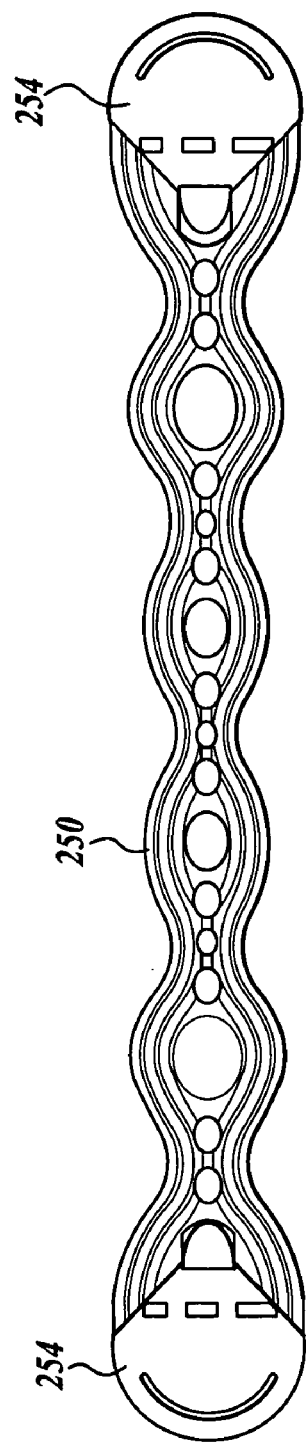
FIGS. 11A and 11B provide a plan view of compression straps and connecting elements constructed in accordance with yet another embodiment of the present invention.
Figure 11B:
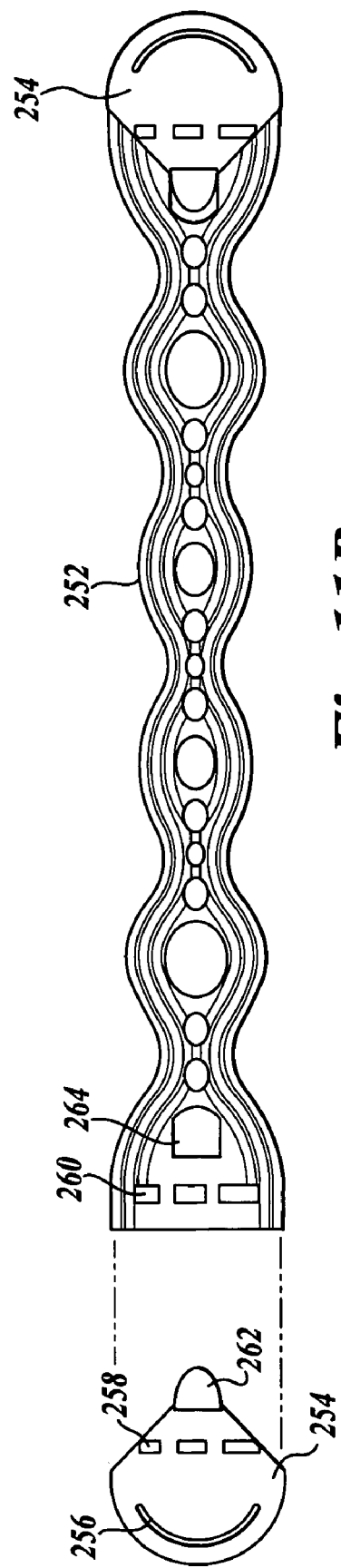

FIGS. 11A and 11B depict yet another embodiment that includes compression straps 250 and 252 that may be formed using an injection molded thermoplastic elastomer or other suitable material. In this particular embodiment, the compression straps 250 and 252 are substantially identical in shape and form, and thus can be produced from the same mold. Connecting elements 254 are configured to detachably connect to each end of the compression straps 250, 252. The connecting elements 254 shown in FIG. 11 may be substantially identical in form and configuration, and thus can also be produced using a single mold. Because only two molds are required to produce the components shown in FIG. 11 (one for the compression straps 250, 252 and the other for the connecting elements 254), this particular embodiment may be advantageous in circumstances where cost and ease of manufacture is important. Another advantage of this embodiment, as will be appreciated from the discussion below, is that it provides users maximum flexibility in assembling and using the object lifting device of the invention.

As illustrated in FIGS. 11A and 11B, each of the connecting elements 254 includes a curvilinear slot 256. Each of the slots 256 is adapted to thread onto a gathering loop, as previously described. The connecting elements 254 may be permanently carried by the gathering loops (not shown).

Each of the connecting elements 254 is further molded, in this example, to include features forming the male half of a two-part buckle. The female half of the two-part buckle is molded as part of the compression straps 250, 252.

In the particular embodiment shown, each connecting element 254 includes one or more members 258 that project orthogonally from the main body of the connecting element 254. The one or more members 258 are sized to project through corresponding sized holes 260 defined at the ends of the compression straps 250, 252.

To complete an attachment of the connecting elements 254 to the compression straps 250, 252, the connecting elements 254 further include a securing element 262 that projects from the main body of the connecting element 254 and mates with a corresponding hole 264 in the compression straps 250, 252. If desired, the securing feature 262 may include a lip or button that snap fits around an edge of the hole 264, or some other mechanism providing a releasable positive connection.

When using an object lifting device that incorporates the compression straps 250, 252 and connecting elements 254 shown in FIG. 11, once three of the four connecting elements 254 are attached to the compression straps 250, 252, as shown, they may typically remain attached to the compression straps 250, 252. Only one of the connecting elements 254 may need to be detached from a compression strap for the lifting device to encircle an object to be lifted, after which the connecting element 254 is reattached to the compression strap 252. Likewise, after lifting an object, only one of the connecting elements needs to be detached from a compression strap to laterally remove the object lifting device from around the object. As illustrated by the several embodiments of the invention described herein, including the embodiment shown in FIG. 11, the components of the object lifting device may assume a variety of configurations that are both useful and pleasing to the eye. One advantage of the compression straps 250, 252 depicted in FIG. 11 is that they are both totally separable from the gathering loops that are used in the object lifting device.

Another advantage of an object lifting device using the compression straps and connecting elements shown in FIG. 11 is that, after transporting an object and setting the object down, any one of the persons helping transport the object may detach any one of the connecting elements from a compression strap to remove the object lifting device from the object. It is not necessary to hunt for any one particular point of connection of the compression straps to the gathering loops. Detaching a connecting element 254 from a compression strap 250, 252 allows the object lifting device to be removed laterally from the object that was lifted, without having to bring the device over the top of or under the object.

Still other embodiments and variations of an object lifting device as described above are encompassed within the present invention. For example, FIGS. 12A and 12B depict an embodiment that uses a single compression strap. In the exemplary embodiment shown in FIG. 12A, the compression strap 270 has a releasable securing mechanism in the form of a clip 272 affixed to one end of the strap, and a hole 274 defined in the other end of the strap. The strap 270 further includes a first pair of holes 276 and a second pair of holes 278 defined in the strap approximately equidistant from the center of the strap. The holes in each of the pair of holes 276, 278 are defined close to each other, but generally with some portion of the strap 270 between them.

FIG. 12B provides a pictorial view of an embodiment of an object lifting device using the strap 270 shown in FIG. 12A. In FIG. 12B, the object lifting device includes a gathering loop 280 affixed to a handle 282, and another gathering loop 284 affixed to a handle 286. The strap 270 is shown wrapped around an object 290 to be lifted. The gathering loop 284 passes through the hole 274, around a portion of the object 290, and passes through the clip 272 (hidden in FIG. 12B) on the other side of the object 290.

Between each of the pair of holes 276, 278, the strap 270 is folded such that the holes in each pair 276, 278 lie opposite of the other with the crease of a fold in the strap 270 between each of the pair of holes. The gathering loop 280 passes through the opposing holes 278 where the strap 270 has been folded, around a portion of the object 290, and, through the opposing holes in the pair of holes 276 (hidden in FIG. 12B) on the other side of the object 290.

When opposing angled lifting forces are applied to the gathering loops 280, 284, the lifting forces that pull the gathering loops are converted to girthing forces that cause the strap 270 to bear against the object 290. More specifically, lifting forces acting on the gathering loop 284 draws the opposing ends of the strap 270 toward each other, while lifting forces acting on the gathering loop 280 draws each of the folds with the pair of holes 276, 278 toward each other.

Several previous embodiments described herein include one or more two-part buckles that heretofore have been described as positioned at the ends of the compression straps. One having ordinary skill in the art will recognize that yet other embodiments of an object lifting device may employ a buckle positioned at a mid portion of one or more of the compression straps. In such an embodiment, the ends of the compression straps may be slidably engaged with the gathering loops in either a detachable or permanent arrangement. At a mid portion of one or more of the compression straps, the compression strap may be divided with one side having one half of a two-part buckle and the other side having the other half of the two-part buckle. The object lifting device may be removed laterally from around an object by detaching the two-part buckle in the mid portion of the strap. A two-part buckle, such as shown in FIG. 8B, or other forms of buckles may be used.

Yet other embodiments of an object lifting device according to the invention may include one or more compression straps formed from multiple connected articulating segments. The articulating segments may be connected to each other through any suitable connecting mechanism, such as a pin and hole arrangement, for example. If desired, embodiments of the invention may be constructed such that the multiple articulating segments are releasably connected to each other. Accordingly, if desired, more or fewer articulating segments may be connected to each other to vary the length of a strap. The two segments defining the ends of the compression strap may further include holes or detachable securing mechanisms, such as clips, as previously described, to attach a compression strap to a gathering loop of the object lifting device.

While several embodiments of the invention have been illustrated and described, the invention is not limited by the precise forms disclosed. Various changes can be made to the embodiments described above without departing from the spirit and scope of the invention. The scope of the invention should be determined from the following claims and equivalents thereto.

The embodiments of the invention in which an exclusive property or privilege is claimed are defined as follows:

1. An object lifting device, comprising:
   a plurality of compression straps, each of which is configured to bear against a surface of an object to be lifted, wherein each compression strap has a first end and a second end; and
   a plurality of gathering loops, each of which is comprised of a flexible material that is slidably engaged with two or more of the compression straps to draw an end of one compression strap toward an opposing end of another compression strap when the gathering loops are pulled, wherein the sliding engagement is such that the two or more compression straps can slide along the flexible material forming the respective gathering loop, and wherein tension on the gathering loops pulls the first and second ends of each compression strap away from each other, with the first end of a compression strap being pulled toward the second end of another compression step, thus causing the compression straps to bear against a surface of the object to be lifted, and
   wherein detachment of a gathering loop from a compression strap enables the object lifting device to be laterally removed from the object without bringing the device over the top or under the bottom of the object.

2. The object lifting device of claim 1, wherein a hole is defined through each end of the compression straps, and wherein each gathering loop is slidingly engaged with the compression straps by passing the flexible material of the gathering loop through the hole at the end of one compression strap and the hole at an opposing end of another compression strap.

3. The object lifting device of claim 1, wherein an end of a compression strap has a securing mechanism attached thereto configured to detachably connect to a gathering loop and thereby slidingly engage the material of the gathering loop.

4. The object lifting device of claim 3, wherein the securing mechanism is a clip that is configured to clip and unclip from a gathering loop and thereby attach and detach the compression strap from the gathering loop.

5. The object lifting device of claim 1, further comprising:
   a handle attached to a gathering loop and adapted to pull the gathering loop when an object is lifted; and
   a length adjusting mechanism adapted to adjust the length of a gathering loop between the handle and the compression strap to which the gathering loop is attached, wherein the handle includes one or more slots through which the material of a gathering loop passes, and wherein the length adjusting mechanism is a D-ring that acts in conjunction with the slots to secure the gathering loop at a desired length to the respective handle.

6. The object lifting device of claim 5, wherein the object lifting device includes three or more compression straps, gathering loops, and handles.

7. The object lifting device of claim 5, further comprising a shoulder strap for attachment to the handle.

8. The object lifting device of claim 1, wherein one or more of the strap ends has a shackle attached thereto through which the material of a gathering loop passes and thereby slidingly engages the strap.

9. The object lifting device of claim 1, wherein one or more of the compression straps further includes a reinforcing strap affixed thereto.

10. The object lifting device of claim 1, further comprising a cradling strap configured to secure at one end to a compression strap, pass under the object being lifted, and secure at the other end to another compression strap.

11. The object lifting device of claim 10, wherein the ends of the cradling strap each have a hook that detachably secures to a hooking loop affixed to the compression straps.

12. An object lifting device, comprising an arrangement of compression straps and gathering loops that, when connected, encircle an object to be lifted,
   wherein each compression strap has a first end and a second end,
   wherein each gathering loop is configured to detachably connect the second end of one compression strap to the first end of another compression strap in sliding engagement whereby tension on the gathering loops pulls the first and second ends of each compression strap away from each other, wit the first end of a compression strap being pulled toward the second end of another compression strap, thus causing the compression straps to bear against a surface of an object to be lifted, and
   wherein detachment of a gathering loop from a compression strap enables the object lifting device to be laterally removed from the object without bringing the device over the top or under the bottom of the object.

13. The object lifting device of claim 12, further comprising two or more handles, with at least one handle attached to each gathering loop for applying pulling tension to the gathering loop.

14. The object lifting device of claim 12, wherein a gathering loop is detachably connected to one of the first or second end of a compression strap using a two-part connecting mechanism, wherein a first part of the connecting mechanism is attached to the gathering loop and a second part of the connecting mechanism is attached to the compression strap, the first and second parts of the two-part connecting mechanism being configured to connect to each other and detachably connect the gathering loop to the compression strap.

15. The object lifting device of claim 14, wherein a gathering loop is detachably connected to the first end of one compression strap using a two-part connecting mechanism and to the second end of another compression strap using another two-part connecting mechanism.

16. The object lifting device of claim 12, wherein three compression straps and three gathering loops are connected in alternating series in which a first gathering loop detachably connects first and second compression straps, a second gathering loop detachably connects the second and third compression straps, and a third gathering loop detachably connects the third and first compression straps.

17. The object lifting device of claim 16, wherein one or more additional compression straps and gathering loops are connected in alternating series.

18. An object lifting device, comprising:
straps, each of which is formed using a single mold design and includes a first part of a two-part detachable connecting mechanism, wherein each strap has a first end and a second end; and
gathering loops, each of which is fanned of a flexible material that carries a second part of the two-part detachable connecting mechanism,
wherein the first and second parts of each two-part connecting mechanism are configured to engage one another to detachably connect the straps to the gathering loops in a series and encircle an object to be lifted, said straps bearing against a surface of the object to be lifted when the gathering loops are pulled, and wherein tension on the gathering loops pulls the first and second ends of each strap away from each other, with the first end of a strap being pulled toward the second end of another strap, thus causing the straps to bear against a surface of the object to be lifted, and
wherein detachment of a gathering loop from a strap enables the object lifting device to be laterally removed from the object without bringing the device over the ton or under the bottom of the object.

19. The object lifting device of claim 18, wherein the straps are formed using an injection molding process.

20. The object lifting device of claim 18, wherein the first part of the two-part connecting mechanism is integrally formed with each strap.

21. The object lifting device of claim 18, wherein the second part of the two-part connecting mechanism is configured to slide along a length of the gathering loop on which it is carried.

22. The object lifting device of claim 18, wherein a gathering loop carries two second parts of two-part connecting mechanisms that detachably connect the gathering loop to two of the straps.

23. The object lifting device of claim 18, wherein all of the gathering loops are configured to detachably connect between the straps in the series.

24. An object lifting device, comprising:
strap means for bearing against a surface of an object to be lifted, wherein the strap means each have a first end and a second end; and
loop means for detachably connecting the strap means around an object to be lifted and for drawing the strap means against the object to be lifted when the loop means are pulled,
wherein detachment of the loop means from the strap means enables the object lifting device to be laterally removed from the object to be lifted without bringing the device over the top or under the bottom of the object, and
wherein a loop means is detachably connected to a strap means in a sliding engagement using a two-part connecting mechanism, the first part of the connecting mechanism being attached to the loop means and the second part of the connecting mechanism being attached to the strap means, the first and second parts of the two-part connecting mechanism being configured to engage one another to detachably connect the loop means to the strap means, wherein tension on the loop means pulls the first and second ends of each strap means away from each other, with the first end of a strap means being pulled toward the second end of another strap means,thus causing the strap means to bear against a surface of the object to be lifted.

25. The object lifting device of claim 24, further comprising handle means attached to the loop means for pulling the loop means and lifting an object.

26. The object lifting device of claim 25, further comprising a shoulder strap attached to the handle means.

27. The object lifting device of claim 25, further comprising length adjustment means for adjusting the length of the loop means between the strap means and the handle means.

28. The object lifting device of claim 24, further comprising hoisting means attached to the loop means for pulling the loop means and lifting an object.

29. The object lifting device of claim 28, wherein the hoisting means is a spreader bar to which the loop means is attached.

30. The object lifting device of claim 24, further comprising cradling means connected to the strap means under the object to be lifted.

31. The object lifting device of claim 1, further comprising a length adjusting mechanism adapted to adjust the length of a gathering loop between a handle on the gathering loop and the compression strap to which the gathering loop is attached, wherein the length adjusting mechanism is adapted for repeated adjustment of the length of the gathering loop.

* * * * *

UNITED STATES PATENT AND TRADEMARK OFFICE
CERTIFICATE OF CORRECTION

PATENT NO. : 7,182,379 B2 Page 1 of 1
APPLICATION NO. : 10/892759
DATED : February 27, 2007
INVENTOR(S) : D.M. Davis It is certified that error appears in the above-identified patent and that said Letters Patent is hereby corrected as shown below:

| | | |
|---|---|---|
| Title Page, Item (76) | Inventor | "Daniel M Davis," should read --Daniel M. Davis,-- |
| Col. 14 (Claim 12, | Ln. 49 line 11) | "wit" should read --with-- |
| Col. 15 (Claim 18, | Ln. 41 line 22) | "ton" should read --top-- |
| Col. 16 (Claim 24, | Ln. 28 line 26) | "means,thus" should read --means, thus-- |

Signed and Sealed this

Tenth Day of July, 2007

JON W. DUDAS
*Director of the United States Patent and Trademark Office*